(12) United States Patent
Lee et al.

(10) Patent No.: US 9,730,509 B2
(45) Date of Patent: Aug. 15, 2017

(54) STRAP UNITING DEVICE FOR WEARABLE DEVICE

(71) Applicant: Samsung Electronics Co., Ltd., Suwon-si, Gyeonggi-do (KR)

(72) Inventors: Min-Sung Lee, Suwon-si (KR); Hee-Cheul Moon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/665,246

(22) Filed: Mar. 23, 2015

(65) Prior Publication Data

US 2015/0265034 A1 Sep. 24, 2015

(30) Foreign Application Priority Data

Mar. 21, 2014 (KR) ........................ 10-2014-0033563

(51) Int. Cl.
| | |
|---|---|
| *A44C 5/18* | (2006.01) |
| *A45F 5/00* | (2006.01) |
| *H04M 1/04* | (2006.01) |
| *H04B 1/3827* | (2015.01) |

(52) U.S. Cl.
CPC .............. *A45F 5/00* (2013.01); *H04B 1/385* (2013.01); *A44C 5/18* (2013.01); *A45F 2005/008* (2013.01); *A45F 2200/0508* (2013.01); *A45F 2200/0516* (2013.01); *A45F 2200/0525* (2013.01); *H04B 2001/3861* (2013.01); *H04M 1/04* (2013.01); *Y10T 24/42* (2015.01); *Y10T 24/45958* (2015.01); *Y10T 24/4782* (2015.01)

(58) Field of Classification Search
CPC ....... A63B 2071/0663; A45F 2005/008; Y10T 24/45775; Y10T 24/45079; Y10T 24/45607; Y10T 24/45984; Y10T 24/1498; Y10T 24/42; Y10T 24/47; Y10T 24/4782; Y10T 24/45958; Y10T 24/45225; G09F 3/005; A44C 5/18
USPC ........ 224/221, 164, 176; 24/16 PB, 265 WS; 63/3.2
See application file for complete search history.

(56) References Cited

U.S. PATENT DOCUMENTS

| | | | | |
|---|---|---|---|---|
| 2,538,265 | A * | 1/1951 | Paston ................. | A44C 5/0053 224/176 |
| 2,937,798 | A * | 5/1960 | Morf .................... | A44C 5/0092 2/321 |
| 3,109,212 | A * | 11/1963 | Emery ................... | B65D 63/14 24/16 PB |
| 3,160,158 | A * | 12/1964 | Rayhart ................ | A61M 25/02 128/DIG. 26 |
| 3,210,820 | A * | 10/1965 | Humiston .......... | A44B 17/0029 24/578.12 |
| 3,929,265 | A * | 12/1975 | Pyne ........................ | A44C 5/16 224/178 |
| 4,221,063 | A * | 9/1980 | Charles .................. | G09F 3/005 283/75 |

(Continued)

FOREIGN PATENT DOCUMENTS

JP 2013-88692 A 5/2013

*Primary Examiner* — Justin Larson
(74) *Attorney, Agent, or Firm* — Jefferson IP Law, LLP

(57) ABSTRACT

A strap uniting device for a wearable device is provided. The strap uniting device includes a base, at least one guide protruded from the base, and at least one catching part protruded from the base, and constructed different from the at least one guide, and arranged parallel with the at least one guide.

7 Claims, 12 Drawing Sheets

(56) References Cited

U.S. PATENT DOCUMENTS

| | | | |
|---|---|---|---|
| 4,464,854 A * | 8/1984 | Hall | G09F 3/005 119/857 |
| 4,581,793 A * | 4/1986 | Micklitz | A63H 33/102 24/297 |
| 4,805,272 A * | 2/1989 | Yamaguchi | A41H 37/001 24/623 |
| 4,805,273 A * | 2/1989 | Burke | A41H 37/04 24/104 |
| 5,226,809 A * | 7/1993 | Franco | A44B 17/0029 24/662 |
| 5,448,846 A * | 9/1995 | Peterson | G09F 3/005 24/484 |
| 5,831,535 A * | 11/1998 | Reisman | G07C 9/00111 340/572.1 |
| 5,933,929 A * | 8/1999 | Kawakami | A44B 17/0035 24/324 |
| 6,371,293 B2 * | 4/2002 | Kubota | 140/93.2 |
| 7,872,588 B2 * | 1/2011 | Potter | G08B 21/0286 2/338 |
| 8,088,043 B2 * | 1/2012 | Andren | A63B 24/00 368/10 |
| 8,122,519 B2 * | 2/2012 | Schmelzer | A42B 1/24 2/1 |
| 8,191,209 B2 * | 6/2012 | Wolfgang | A44C 5/16 224/180 |
| 8,250,796 B2 * | 8/2012 | Padgett | G09F 3/005 283/75 |
| 8,408,436 B2 * | 4/2013 | Berry | A63B 24/00 224/176 |
| 8,574,205 B2 * | 11/2013 | Biry | A61B 17/20 119/654 |
| 8,590,192 B2 * | 11/2013 | Padgett | A44C 5/0069 283/75 |
| 8,763,869 B2 * | 7/2014 | Gerard-Goddet | A44C 5/0053 224/164 |
| 8,834,058 B2 * | 9/2014 | Woicke | B01J 19/32 24/662 |
| 8,919,019 B2 * | 12/2014 | Martinez | G06F 15/00 224/164 |
| 9,314,072 B2 * | 4/2016 | Lee | A44B 11/24 |
| 2009/0265971 A1 * | 10/2009 | Cook | G09F 3/005 40/633 |
| 2010/0331145 A1 * | 12/2010 | Lakovic | G04F 10/00 482/8 |
| 2013/0219960 A1 * | 8/2013 | Gerard-Goddet | A44C 5/0053 63/3.2 |
| 2013/0227988 A1 * | 9/2013 | Padgett | A44C 5/0015 63/1.13 |
| 2013/0298353 A1 * | 11/2013 | Drane | B65D 63/1063 24/16 PB |
| 2015/0241917 A1 * | 8/2015 | Seok | A61B 5/681 361/679.03 |
| 2015/0265034 A1 * | 9/2015 | Lee | A45F 5/00 224/219 |

* cited by examiner

STRAP UNITING DEVICE FOR WEARABLE DEVICE

CROSS-REFERENCE TO RELATED APPLICATION(S)

This application claims the benefit under 35 U.S.C. §119 (a) of a Korean patent application filed on Mar. 21, 2014 in the Korean Intellectual Property Office and assigned Serial number 10-2014-0033563, the entire disclosure of which is hereby incorporated by reference.

TECHNICAL FIELD

The present disclosure relates to a strap uniting device worn on the wrist in an electronic device.

BACKGROUND

Traditional methods of carrying an electronic device, include carrying the electronic device in a user's pocket or bag and the like, holding the electronic device with the user's hand, or wearing the electronic device on a certain portion of the human body.

The method of wearing a wearable device on the human body is given as follows:

1. Wearing the wearable device on the human body such as the wrist in a manner of a wristwatch or a band;
2. Hanging a strap of the wearable device on the human body in a manner of a necklace;
3. Wearing the wearable device similar to glasses in a manner of wearing glasses on the face;
4. Wearing the wearable device fitted to a portion of the human body in a manner of clothing, or clipped to clothing; or
5. Wearing by directly or indirectly attaching the wearable device to various portions of the human body, belongings, or an accessory.

Also, in a schematic construction of the wearable device, the wearable device consists of a body and a wearing part (i.e., a strap or band). The wearable device is worn on various portions of the human body in accordance with a construction of the wearing part.

The above information is presented as background information only to assist with an understanding of the present disclosure. No determination has been made, and no assertion is made, as to whether any of the above might be applicable as prior art with regard to the present disclosure.

SUMMARY

In most cases, a wearable device is of a form in which a design factor and a body are designed irrelevant to each other. In most cases, a body appearance and a wearing part are faithful to the same plane surface/curved surface form or a pure design form. This appearance of the wearable device acts as an element restricting a function and design of the wearable device.

Also, the wearable device has the merit of being capable of stably wearing on the human body because the body and the wearing part are integrated. In contrast, the wearable device has a problem of acting as a limitation in providing various designs and ordering functions by individual because replacement is impossible.

Further, the wearing part of the wearable device is worn on the human body with a strap and a uniting tool (for example, a buckle). In most cases, the uniting tool is integrally made and fixed to the strap. That is, it is impossible that the uniting tool of the related art is exchanged in the strap.

Also, in the structure of the uniting tool of the wearable device, the uniting tool is inserted into a strap hole of the strap to bind the strap to the wrist. However, because the uniting tool for strap coupling has one or two uniting pins, it is inconvenient to wear the wearable device on the wrist.

For instance, in a case where the uniting tool has one uniting pin, it is convenient for wearing the wearable device on the wrist. But, because both straps are loosely worn on the wrist, the wearable device does not fit better, and the one strap spins free.

In a case where the uniting tool has two uniting pins, the both straps are fittingly worn on the wrist, but a wearing action is inconvenient.

Aspects of the present disclosure are to address at least the above-mentioned problems and/or disadvantages and to provide at least the advantages described below. Accordingly, an aspect of the present disclosure is to provide a strap uniting device in which a uniting tool has a structure serving as a guide function and a catching part serving as a fixing function respectively, thereby preventing a strap spinning phenomenon while improving a convenience of wrist wearing.

Another aspect of the present disclosure is to provide a device of constructing a uniting tool detachable from a strap, and constructing the uniting tool using various materials and colors, thereby exhibiting a user personality and improving a freedom degree of a product design.

Another aspect of the present disclosure is to provide a device in which a uniting tool is easily attached to and detached from a strap.

Another aspect of the present disclosure is to provide a device in which a uniting tool is constructed detachable from a strap, thereby being capable of independently applying a design of the strap and a design of the uniting tool, for example, materials or colors.

In accordance with an aspect of the present disclosure, a strap uniting device for a wearable device is provided. The strap uniting device includes first and second straps, and a uniting tool provided in the first strap and bound to the second strap. The uniting tool includes a base, at least one guide protruded from the base, and at least one catching part protruded from the base, and constructed different from the at least one guide, and arranged parallel with the at least one guide.

In accordance with another aspect of the present disclosure, a strap uniting device for a wearable device is provided. The strap uniting device includes first and second straps, and a uniting tool provided in the first strap and bound to the second strap. The uniting tool is exchangeable in the first strap by a detachable structure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, it should be noted that like reference numbers are used to depict the same or similar elements, features, and structures.

DETAILED DESCRIPTION

Figure 1:
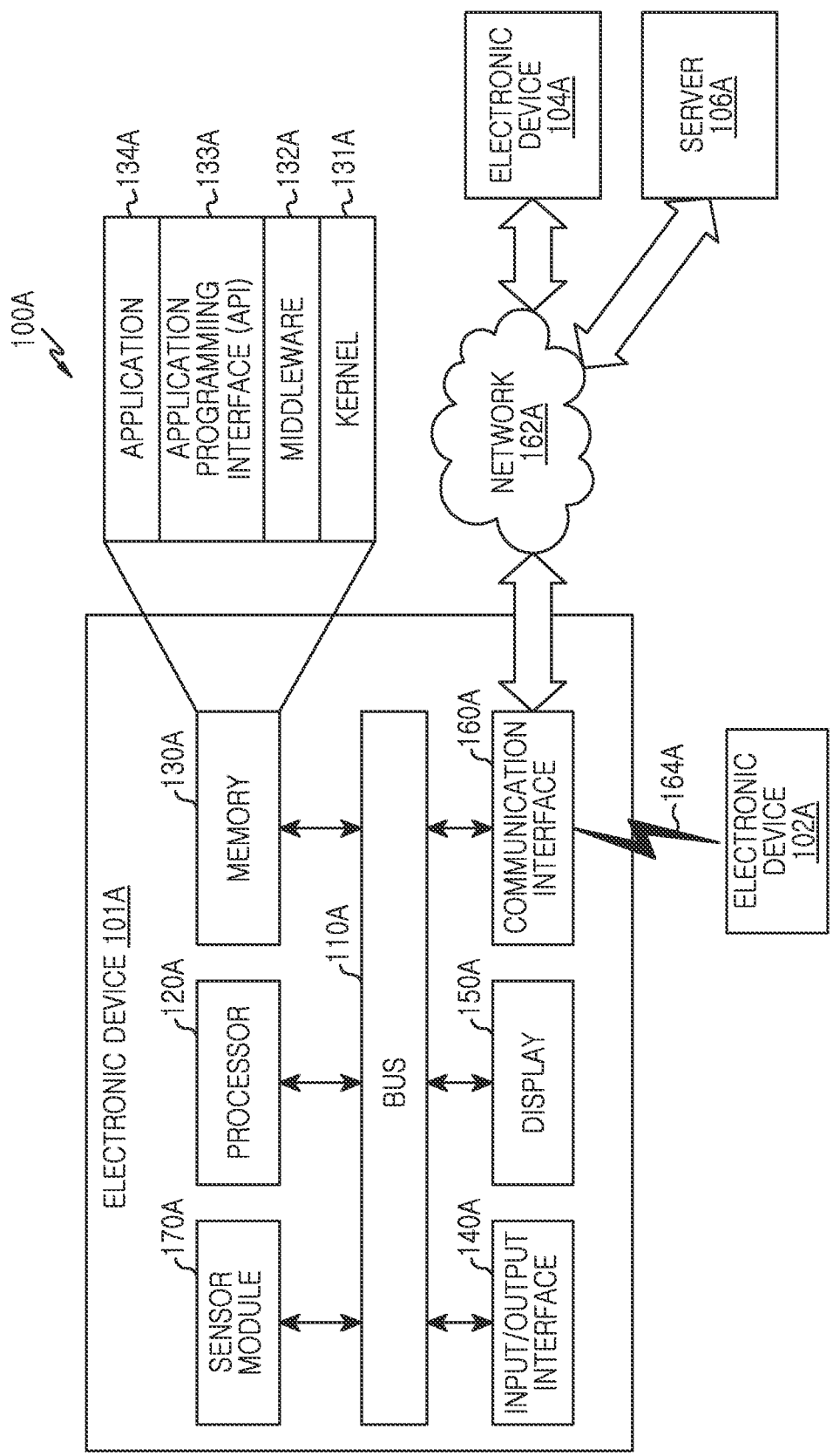
FIG. 1 is a schematic block diagram illustrating an internal construction of a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions "comprise", "may comprise" or the like usable in the present disclosure indicate the existence of disclosed corresponding functions, operations, constituent elements or the like, and do not limit additional one or more functions, operations, constituent elements or the like. Also, in the present disclosure, the terms "comprise", "have" or the like are to designate the existence of features stated in the specification, numerals, operations, constituent elements, components, or a combination of them, and it should be understood that the terms "comprise", "have" or the like are not to previously exclude the possibility of existence or addition of one or more other features, numerals, operations, constituent elements, components, or combinations of them.

In the present disclosure, the expressions such as "or" and the like include any and all combinations of words enumerated together. For example, "A or B" may include A, or may include B, or may include all A and B.

The expressions "1st", "2nd", "first", "second" or the like used in the present disclosure may modify various constituent elements of the present disclosure, but are not intended to limit the corresponding constituent elements. For example, the expressions do not limit the order and/or importance and the like of the corresponding constituent elements. The expressions may be used to distinguish one constituent element from another constituent element. For example, all of a first user device and a second user device are user devices, and represent different user devices. For example, a first constituent element may be named as a second constituent element without departing from the scope of right of the present disclosure. Likely, even a second constituent element may be named as a first constituent element.

When it is mentioned that any constituent element is "connected" or "accessed" to another constituent element, the any constituent element may be directly connected or accessed to the another constituent element, but it should be understood that new other constituent element may also exist between the constituent element and the another constituent element. In contrast, when it is mentioned that any constituent element is "directly connected" or "directly accessed" to another constituent element, it should be understood that no new other constituent element exists between the constituent element and the another constituent element.

The terms used in the present disclosure are used for just describing specific embodiments, and do not intend to limit one embodiment of the present disclosure.

Unless defined otherwise, all the terms used herein including the technological or scientific terms have the same meaning as those commonly understood by a person having ordinary knowledge in the art which the present disclosure belongs to. The terms as defined in a general dictionary should be interpreted as having the same meanings as the contextual meanings of a related technology, and are not interpreted as having ideal or excessively formal meanings unless defined clearly in the present disclosure.

An electronic device according to the present disclosure may be a device including a telecommunication function. For example, the electronic device may include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Moving Picture Experts Group (MPEG-1 or MPEG-2) Audio Layer 3 (MP3) player, a mobile medical instrument, a camera, or a wearable device (e.g., a Head Mounted Display (HMD) such as electronic glasses, electronic clothes, an electronic bracelet, an electronic necklace, an appcessory, an electronic tattoo, or a smart watch).

According to various embodiments of the present disclosure, the electronic device may be smart home appliances having a telecommunication function. The smart home appliances may include, for example, at least one of a television (TV), a Digital Versatile Disc (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic locking system, a camcorder, or an electronic frame.

According to various embodiments of the present disclosure, the electronic device may include at least one of various medical instruments (e.g., Magnetic Resonance Angiography (MRA), Magnetic Resonance Imaging (MRI), Computerized Tomography (CT), a moving-camera, an ultrasonic machine and the like), a navigation device, a Global Positioning System (GPS) receiver, an Event Data Recorder (EDR), a Flight Data Recorder (FDR), a car infotainment device, an electronic equipment for ship (e.g., a navigation device for ship, a gyrocompass and the like), avionics, a security instrument, or an industrial or home robot.

According to various embodiments of the present disclosure, the electronic device may include at least one of a part of furniture or building/structure including a telecommunication function, an electronic board, an electronic signature receiving device, a projector, or various metering instruments (e.g., for tap water, electricity, gas, or radio wave metering instruments, and the like). The electronic device according to the present disclosure may be one of the aforementioned various devices or a combination of two or more. Also, it is obvious to those skilled in the art that the electronic device according to the present disclosure is not limited to the aforementioned instruments.

Below, an electronic device according to various embodiments will be described with reference to the accompanying drawings. The term 'user' used in the various embodiments may denote a person who uses the electronic device or a device (e.g., an artificial intelligent electronic device) which uses the electronic device.

FIG. 1 illustrates a network environment including an electronic device 1 according to various embodiments of the present disclosure.

Referring to FIG. 1, an electronic environment 100A includes an electronic device 101A. The electronic device 101A may include a bus 110A, a processor 120A, a memory 130A, an input/output interface 140A, a display 150A, a communication interface 160A, and a sensor module 170A, but is not limited thereto.

The bus 110A may be a circuit connecting the aforementioned constituent elements with one another and forwarding a communication signal (e.g., a control message) between the aforementioned constituent elements.

The processor 120A may, for example, receive instructions from the aforementioned other constituent elements (e.g., the memory 130A, the input/output interface 140A, the display 150A, the communication interface 160A, the sensor module 170A, and the like) through the bus 110A, and decipher the received instructions, and execute operation or data processing according to the deciphered instructions.

The memory 130A may store an instruction or data that is received from the processor 120A or the other constituent elements (e.g., the input/output interface 140A, the display 150A, the communication interface 160, the sensor module 170A, and the like) or is generated by the processor 120A or the other constituent elements. The memory 130A may, for example, include programming modules such as a kernel 131A, a middleware 132A, an Application Programming Interface (API) 133A, an application 134A and the like. The aforementioned programming modules each may be comprised of software, firmware, hardware or a combination of at least two or more of them.

The kernel 131A may control or manage system resources (e.g., the bus 110A, the processor 120A, the memory 130A, and the like) used for executing operations or functions implemented in the remnant other programming modules, for example, the middleware 132A, the API 133A, or the application 134A. Also, the kernel 131A may provide an interface enabling the middleware 132A, the API 133A, or the application 134A to connect and control or manage the individual constituent element of the electronic device 101A.

The middleware 132A may perform a relay role of enabling the API 133A or the application 134A to communicate and exchange data with the kernel 131A. Also, in relation to work requests received from the application 134A, the middleware 132A may, for example, perform control (e.g., scheduling or load balancing) for the work requests using a method of allocating at least one application among the applications 134A priority order capable of using the system resources (e.g., the bus 110A, the processor 120A, the memory 130A or the like) of the electronic device 101A.

The API 133A is an interface enabling the application 134A to control a function provided by the kernel 131A or the middleware 132A. The API 133A may, for example, include at least one interface or function (e.g., an instruction) for file control, window control, picture processing, character control, and the like.

According to various embodiments of the present disclosure, the application 134A may include a Short Message Service (SMS)/Multimedia Messaging Service (MMS) application, an electronic mail (e-mail) application, a calendar application, an alarm application, a health care application (e.g., an application measuring momentum, blood sugar or the like), environment information application (e.g., an application providing air pressure, humidity, temperature information, and the like), and the like. Additionally or alternatively, the application 134A may be an application related with information exchange between the electronic device 101A and an external electronic device (e.g., an electronic device 102A or an electronic device 104A). The application related with the information exchange may include, for example, a notification relay application for relaying specific information to the external electronic device, or a device management application for managing the external electronic device.

For example, the notification relay application may include a function of relaying to the external electronic device (e.g., the electronic device 102A or the electronic device 104A) notification information generated in other applications (e.g., the SMS/MMS application, the e-mail application, the health care application, the environment information application, and the like) of the electronic device 101A. Additionally or alternatively, the notification relay application may, for example, receive notification information from the external electronic device (e.g., the electronic device 102A or the electronic device 104A) and provide the received notification information to a user. The device management application may, for example, manage (e.g., install, delete and/or update) a function (e.g., turn-on/turn-off of the external electronic device (or constituent components of the electronic devices 102A and 104A), or adjustment of a brightness (or resolution) of a display) of at least a part of the external electronic device (e.g., the electronic device 102A or the electronic device 104A) communicating with the electronic device 101A, an application operating in the external electronic device, or a service (e.g., a telephony service or a message service) provided in the external electronic device.

According to various embodiments of the present disclosure, the application 134A may include an application designated according to an attribute (e.g., the kind of electronic device) of the external electronic device (e.g., the electronic device 102A or the electronic device 104A). For example, when the external electronic device is an MP3 player, the application 134A may include an application related with music playback. Similarly, when the external electronic device is a mobile medical instrument, the application 134A may include an application related with health care. According to an embodiment of the present disclosure, the application 134A may include at least one of an application designated to the electronic device 101A or an application received from the external electronic device (e.g., the server 106A or the electronic device 102A or the electronic device 104A).

The input/output interface 140A may forward an instruction or data, which is inputted from a user through an input/output device (e.g., a sensor, a keyboard or a touch screen), for example, to the processor 120A, the memory 130A and the communication interface 160A through the bus 110A. For example, the input/output interface 140A may provide data about a user's touch inputted through the touch screen, to the processor 120A. Also, the input/output interface 140A may, for example, output through an input/output device (e.g., a speaker or a display) an instruction or data which is received from the processor 120A, the memory 130A, the communication interface 160A or the sensor module 170A through the bus 110A. For example, the input/output interface 140A may output voice data, which is processed through the processor 120A, to the user through the speaker.

The display 150A may display various information (e.g., multimedia data, text data, or the like) to a user.

The communication interface 160A may connect communication between the electronic device 101A and the external device (e.g., the electronic device 102A or the electronic device 104A or the server 106A). For example, the communication interface 160A may support a network communication 162A (e.g., Internet, a Local Area Network (LAN), a Wireless Area Network (WAN), a telecommunication network, a cellular network, or a satellite network), a short-range communication 164A (e.g., WiFi, Bluetooth (BT), Near Field Communication (NFC)), or a wired communication (e.g., a Universe Serial Bus (USB), a High Definition Multimedia Interface (HDMI), a Recommended Standard-232 (RS-232), or a Plain Old Telephone Service (POTS)).

According to an embodiment of the present disclosure, the network 162A may be a telecommunications network. The telecommunications network may include at least one of a computer network, the Internet, internet of things, or a telephone network. According to an embodiment of the present disclosure, a protocol (e.g., a short-range communication protocol, a network communication protocol, or a wired communication protocol) for communication between the electronic device 101A and an external device may be supported in at least one of the application 134A or the middleware 132A. Each of the electronic devices 102A and 104A may be the same (e.g., same-type) device as the electronic device 101A or a different (e.g., different-type) device.

The sensor module 170A may measure a physical quantity or sense an activation state of the electronic device and convert the measured or sensed information into an electric signal. The sensor module 170A may include, for example, at least one of a gesture sensor, a gyro sensor, an air pressure sensor, a magnetic sensor, an acceleration sensor, a grip sensor, a proximity sensor, a color sensor (e.g., Red Green Blue (RGB) sensor), a bio-physical sensor, a temperature/humidity sensor, an illumination sensor, or an Ultraviolet (UV) sensor.

Additionally, the sensor module 170A may include, for example, an Electronic nose (E-nose) sensor, an Electromyography (EMG) sensor, an Electroencephalogram (EEG) sensor, an Electrocardiogram (ECG) sensor, an iris recognition sensor, a fingerprint recognition sensor or the like.

Below, an electronic device according to various embodiments of the present disclosure is described with reference to the attached drawings. The term 'user' used in various embodiments of the present disclosure may denote a person who uses the electronic device or a device (e.g., an artificial intelligent electronic device) which uses the electronic device.

Figure 2:
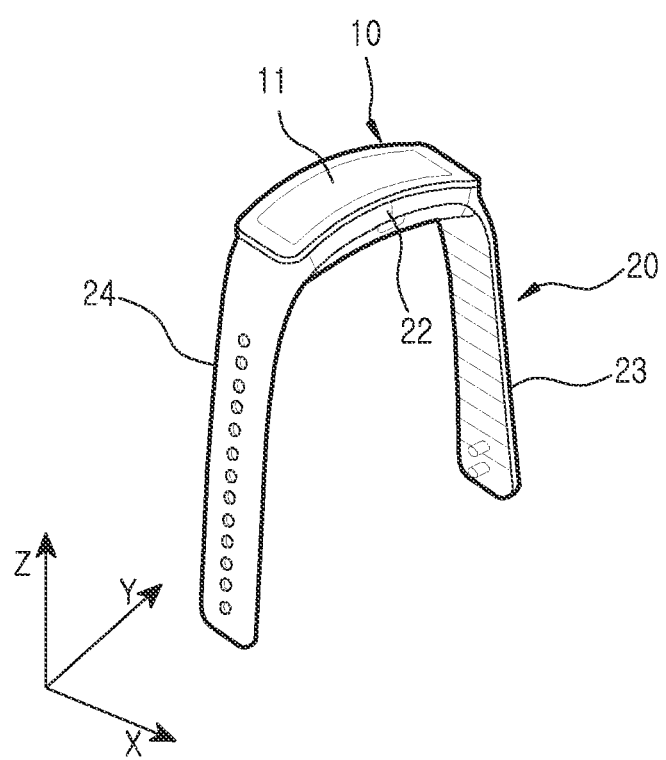
FIG. 2 is a perspective diagram illustrating a wearable device in which a body is coupled to a wearing part according to various embodiments of the present disclosure.

FIG. 2 is a perspective diagram illustrating a wearable device that is one of a plurality of electronic devices according to various embodiments of the present disclosure.

Figure 3:
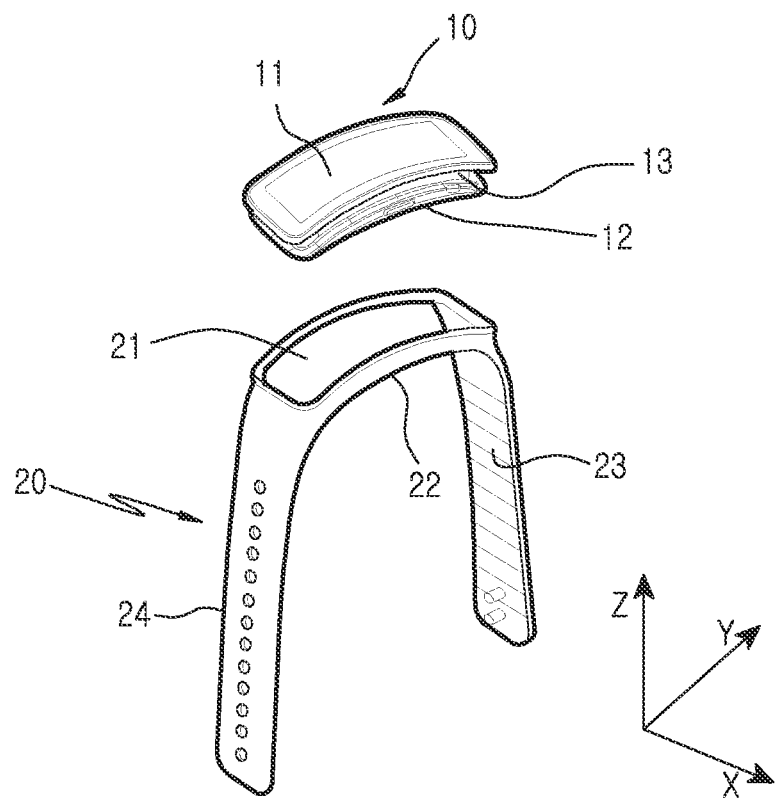
FIG. 3 is a perspective diagram illustrating a wearable device in which a body is separated from a wearing part according to various embodiments of the present disclosure.

FIG. 3 is a perspective diagram illustrating a wearable device in which a body and a strap are isolated according to various embodiments of the present disclosure.

Referring to FIGS. 2 and 3, a wearable device according to various embodiments of the present disclosure, an electronic device worn on the human body, is for example an electronic device convenient for wearing on the wrist, such as a wristwatch or bracelet, or a communication device or an medical assistant instrument. However, the wearable device does not need to be limited to being worn about the wrist. For instance, the wearable device is identically applicable to a human body portion having a curvature among portions of the human body. As an example of a portion of the human body having the curvature, may include the wrist, ankle, and the like. Also, the wearable device may be stably worn on various portions of the human body if a strap 20 is variously constructed.

The wearable device may include a body 10 and a wearing part 20. Since the wearing part 20 wears the body 10 on the wrist, the wearing part 20 is dubbed the strap 20 below. The body 10 may be configured to be forcibly combined or separated from the strap 20. The body 10 may include a display 11 for displaying various information in appearance, a press key (i.e., a side key) (not shown) for inputting various information, a sensor, a touch input part, and the like. The body 10 is of a bar shape, and may have a curvature. The body 10 may be formed in a shape extending long in length orientation and may be formed in a shape having a curvature. To attach and detach the body 10 from the strap 20, the body 10 may have a body safe mounting part 22. The strap 20 further includes first and second straps 23 and 24.

Figure 4:
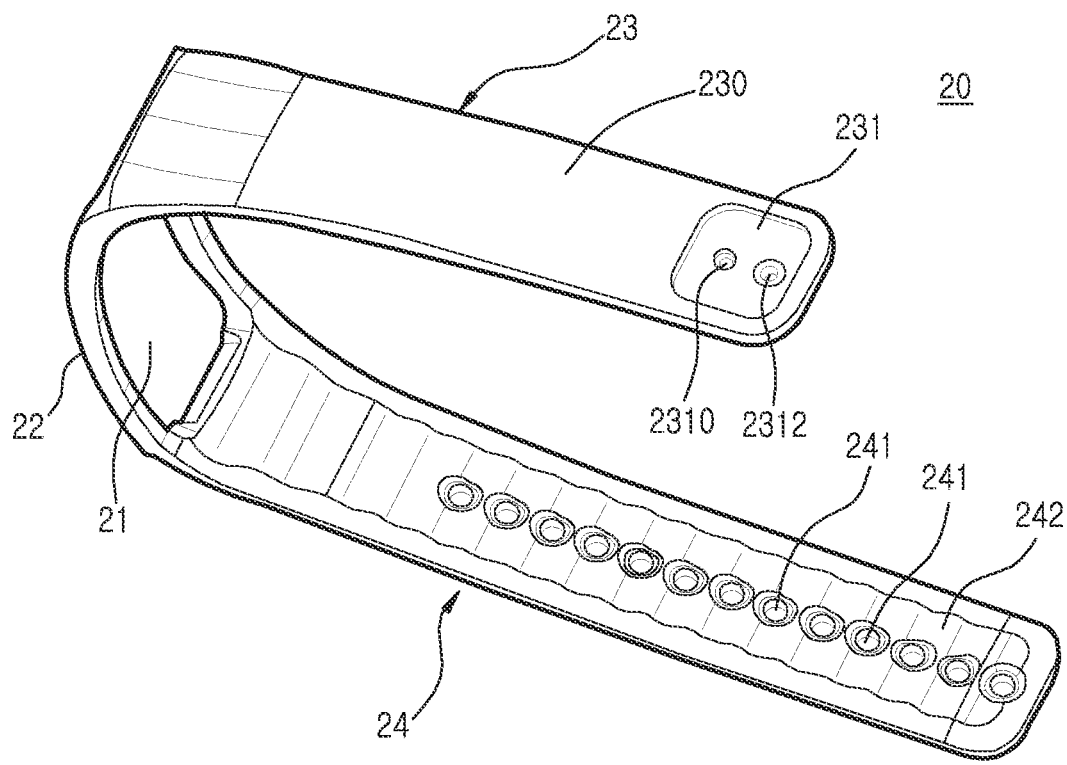
FIG. 4 is a perspective diagram illustrating a strap of a wearing part according to various embodiments of the present disclosure.

FIG. 4 is a perspective diagram illustrating a strap according to various embodiments of the present disclosure.

Figure 5:
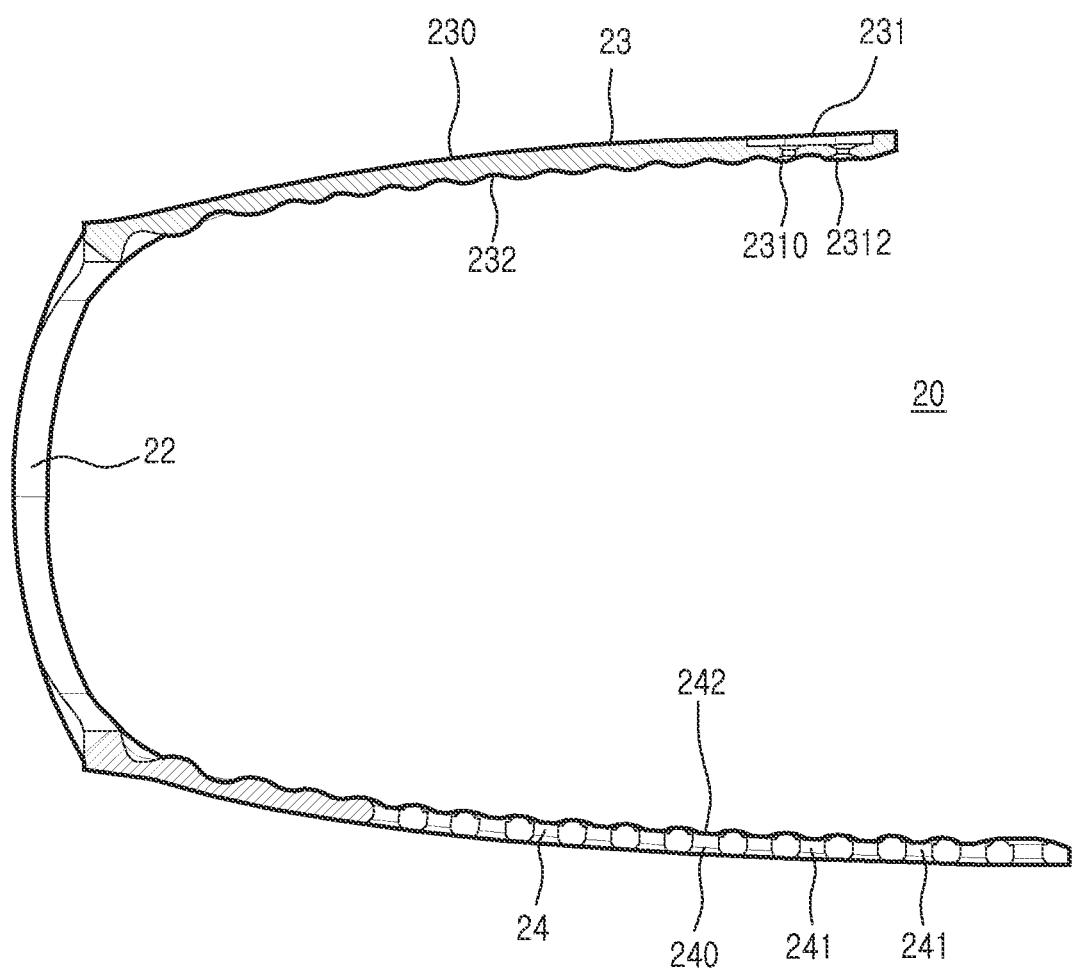
FIG. 5 is a cross section illustrating a strap of a wearing part according to various embodiments of the present disclosure.

FIG. 5 is a cross section illustrating a strap according to various embodiments of the present disclosure.

Referring to FIGS. 4 and 5, the strap 20 may be formed of elastic materials. Thus, the strap 20 may stably wear the body on the human body and may be closely adhered to the human body. Also, because the strap 20 is exchangeable, the strap 20 takes charge of an accessory function representing user's personality or taste. In the strap 20, a body safe mounting part 22 is configured to make elastic deformation possible, and a wearing surface portion closely adhered to the human body may not be formed of elastic materials. The body 10 may have an opening 21. The body safe mounting part 22 is provided to surround the opening 21.

Figure 7:
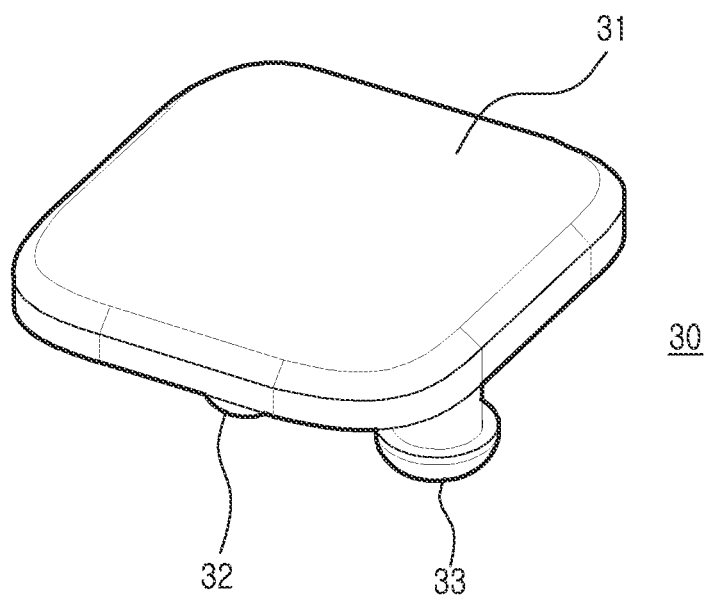
FIGS. 7 and 8 are perspective diagrams illustrating a uniting tool according to various embodiments of the present disclosure, respectively.
Figure 8:
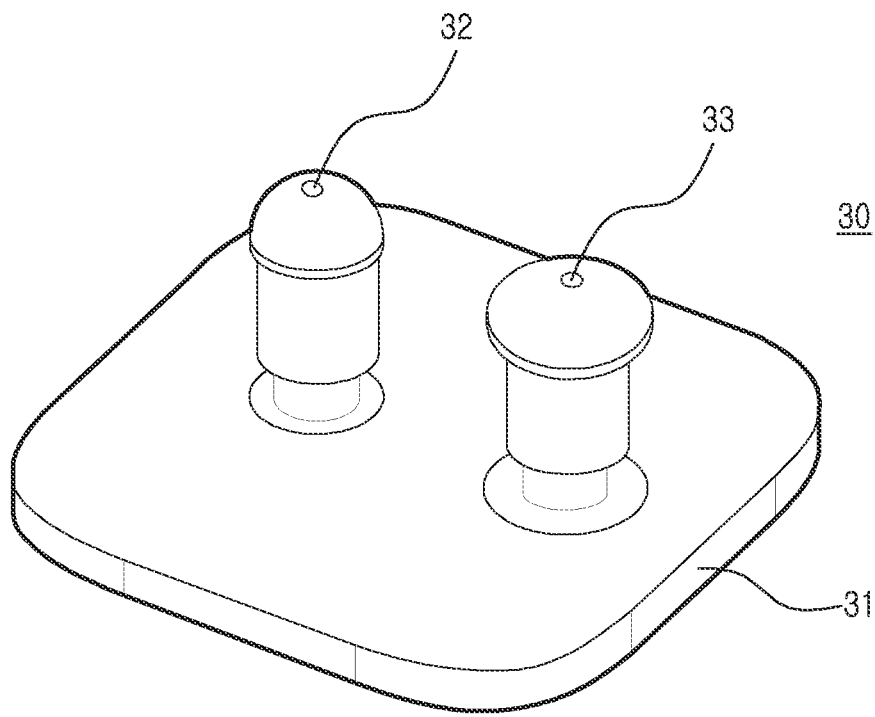

The strap 20, a part wearable on the wrist of the body, includes first and second straps 23 and 24 and a uniting tool (shown in FIGS. 7 and 8). The first strap 23 is of a long band shape extended in one orientation, and may have a first outer surface 230 and a first inner surface 232. The second strap 24 is of a long shape extending in one orientation, and may have a second outer surface 240 and a second inner surface 242. The first and second inner surfaces 232 and 242 may be dubbed first and second wearing surfaces in that the first and second inner surfaces 232 and 242 are surfaces closely adhered to the wrist. The first and second wearing surfaces 232 and 242 may be formed to have a rugged part (i.e., a section of a wave shape).

The first strap 23 may attach and detach a uniting tool at an end thereof. The uniting tool will be described in detail later. The first strap 23 may have recesses 231, 2310 and 2312 constructing a uniting tool safe mounting part for fixing or separating the uniting tool. The second strap 24 may have a plurality of wearing holes 241 along length orientation.

Figure 6:
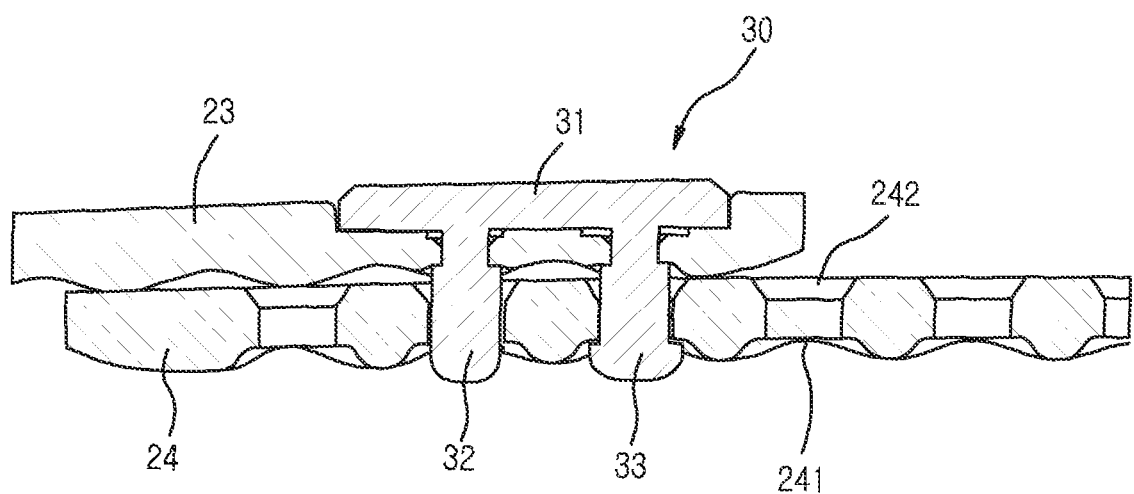
FIG. 6 is a cross section illustrating a state in which a uniting tool is bound to first and second straps according to various embodiments of the present disclosure.

FIG. 6 is a cross section illustrating a state in which a uniting tool is bound to a first and second straps according to various embodiments of the present disclosure.

Referring to FIG. 6, a strap uniting device according to various embodiments of the present disclosure is described. The strap uniting device according to the various embodiments of the present disclosure includes the first and second straps 23 and 24, and the uniting tool 30 provided in the first strap 23 and bound to the second strap 24. The uniting tool 30 includes a base 31, one or a plurality of guides 32, and one or a plurality of catching parts 33 having a shape different from the guides 32. The uniting tool 30 is exchangeable by a detachable structure in the uniting tool safe mounting part. Also, the uniting tool 30 may be formed of metal materials, or hard or soft synthetic resins having elasticity.

The uniting tool 30 shown in FIG. 6 is configured to have one guide 32 and one catching part 33 according to an embodiment of the present disclosure, but may be configured to have two guides and one catching part, and may be configured to have one guide and two catching parts. Regarding arrangement positions of the guide 32 of the uniting tool 30 and the catching part 33 thereof, the catching part 33 may be arranged close to an end of the first strap 23, and the guide 32 may be arranged relatively away from the end. Also, the catching part 33 may be arranged away from the end of the first strap 23, and the guide 32 may be relatively arranged relatively close to the end. Compared to a strap uniting device having only one catching part or a strap uniting tool having two catching parts, the uniting tool having one guide and one catching part according to various embodiments of the present disclosure facilitates an operation of wearing on the wrist. Structures of the guide and the catching part are described below.

The guide 32 and the catching part 33 may be constructed in a roughly cylindrical shape respectively, but may be constructed in a multi-sided pillar shape. The multi-sided pillar shape includes a shape such as a four-angle pillar, a five-angle pillar, a six-angle pillar and the like.

The guide 32 is bound to the first strap 23 and is inserted into the wearing hole of the second strap 24, thereby preventing the mobility of the first and second straps 23 and 24, along with the catching part 33. In other words, when the first and second straps 23 and 24 are bound to the wrist, the guide 32 is selectively inserted into the wearing hole of the second strap 24 to primarily guide a wearing action. If the catching part 33 is combined to the wearing hole of the second strap 24, the guide 32 prevents the mobility of the first and second straps 23 and 24, together with the catching part 33.

The catching part 33 is bound to the first strap 23 and bound to the second strap 24, thereby fixing the first and second straps 23 and 24. Accordingly, the catching part 33 may have two catching structures. The catching part 33 may have a catching structure for binding to the first strap 23, and a catching structure for binding to the second strap 24.

FIGS. 7 and 8 are perspective diagrams illustrating a uniting tool according to various embodiments of the present disclosure, respectively.

Figure 9:
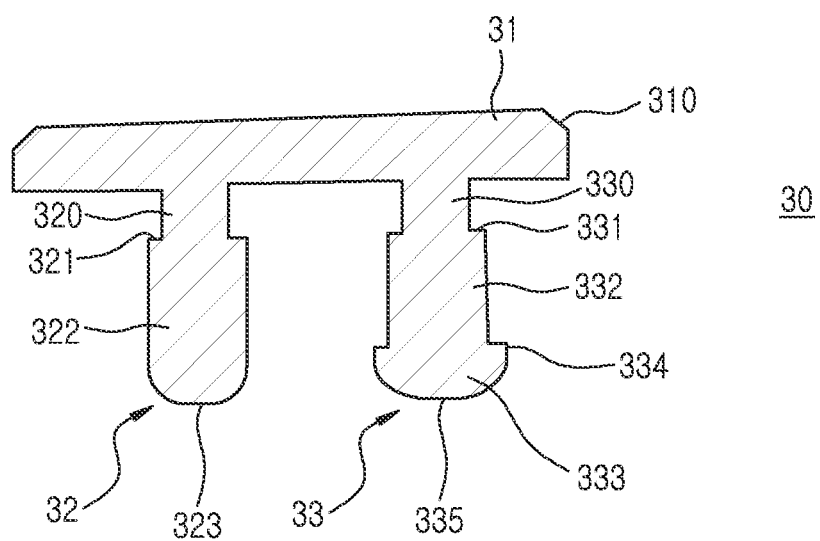
FIG. 9 is a cross section illustrating a uniting tool according to various embodiments of the present disclosure.

FIG. 9 is a cross section illustrating a uniting tool according to various embodiments of the present disclosure. A construction of the uniting tool 30 according to the various embodiments of the present disclosure will be described with reference to FIGS. 7 to 9.

Referring to FIGS. 7 to 9, a uniting tool 30 includes a guide 32 and a catching part 33. The guide 32 includes first and second cylindrical guides 320 and 322, and a curved surface guide 323 so as to bind the guide 32 to the first strap 23 and insert the guide 32 to the second strap 24.

The first cylindrical guide 320 is integrally formed in the base 31, and may be a portion bound to the first strap 23. The second cylindrical guide 322 may be having a diameter larger than the first cylindrical guide 320 and thus have a first step part 321. The second cylindrical guide 322 may be a portion bound to the first strap 23 by the first step part 321. The curved surface guide 322 is extended from the second cylindrical guide 322. The curved surface guide 322 may be of a convex shape facilitating insertion into a first uniting opening of the second strap 24. The curved surface guide 322 may be constructed in a domelike shape.

The catching part 33 may include first, second, and third cylindrical catching parts 330, 332, and 333, and a curved surface catching part 335. The first cylindrical catching part 330 is formed in the base 31, and may be a portion bound to the first strap 23. The second cylindrical catching part 332 may be extended in diameter larger than the first cylindrical catching part 330 and thus have a second step part 331. The second cylindrical catching part 332 may be a portion bound to the first strap 23 by the second step part 331. The third cylindrical catching part 333 may be extended in diameter larger than the second cylindrical catching part 332 and thus have a third step part 334. The third cylindrical catching part 333 may be a portion bound to the first strap 23 by the third step part 334. The curved surface catching part 335 may be a portion extending from an end of the third cylindrical catching part 333 and facilitating insertion into a second binding opening of the second strap 24. The curved surface catching part 335 may be constructed in a convex shape, for example, a dome-like shape.

Though described earlier, the guide 32 is of a shape having one catching structure for binding to the first strap 23, and the catching part 33 may be constructed in a shape having two catching structures for binding to the first and second straps 23 and 24 respectively. Also, the base 31 includes a portion 310 slantingly cutting a surrounding edge of an outer surface thereof.

Figure 10:
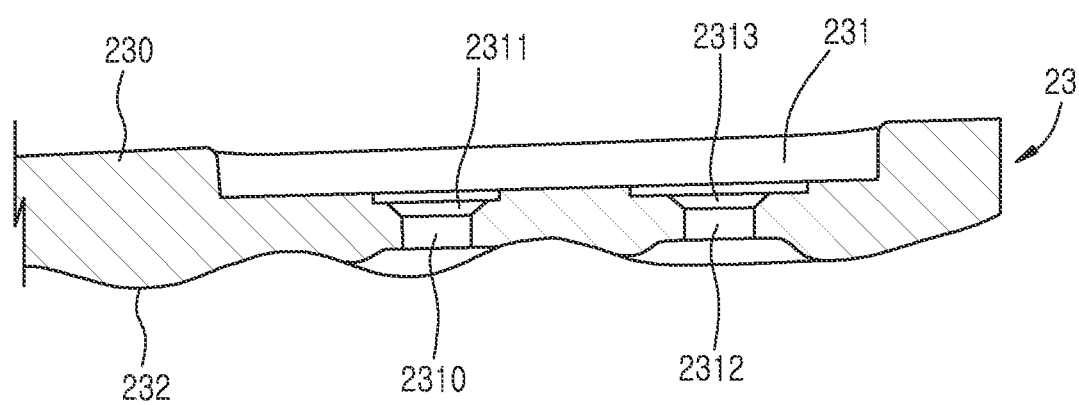
FIG. 10 is a cross section illustrating a uniting tool safe mounting part according to various embodiments of the present disclosure.

FIG. 10 is a cross section illustrating a uniting tool safe mounting part according to various embodiments of the present disclosure. A construction of the uniting tool safe mounting part according to the various embodiments of the present disclosure is described with reference to FIG. 10.

Referring to FIG. 10, a safe mounting part may have a plurality of recesses for attaching and detaching a uniting tool. The safe mounting part includes recesses for attaching and detaching the guide 32, and a recess for attaching and detaching the catching part 33. The safe mounting part for the guide 32 includes a first recess 231 safely mounting the base 31, a truncated cone shape second recess 2311 inserting the guide and opened from the first recess 231, and a cylindrical third recess 2310 binding the guide 32 and opened from the second recess 2311. The first recess 231 may be a flat panel type groove shape fixing the base 31. The second recess 2311 may be a truncated cone shape hole for easily inserting the curved surface guide 323. The third recess 2310 may be a cylindrical hole for binding the second cylindrical guide 322.

Also, the uniting tool safe mounting part may include a truncated cone fourth recess 2313 inserting the catching part 33, and spaced apart from the second recess 2311, and opened from the first recess 231, and a cylindrical fifth recess 2312 binding the catching part 33 and opened from the fourth recess 2313. The fourth recess 2313 is a truncated cone shape hole for easily inserting the curved surface catching part 335. The fifth recess 2312 may be a cylindrical hole for binding the cylindrical catching part 332.

As illustrated again in FIG. 6, the second strap 24 may have a plurality of wearing holes for selectively inserting the guide 32 and the catching part 33, respectively, in parallel with one another. The respective wearing holes may have a truncated cone shape recess 242, and a cylindrical recess 241 opened from the truncated cone shape recess 242, respectively.

Figure 11:
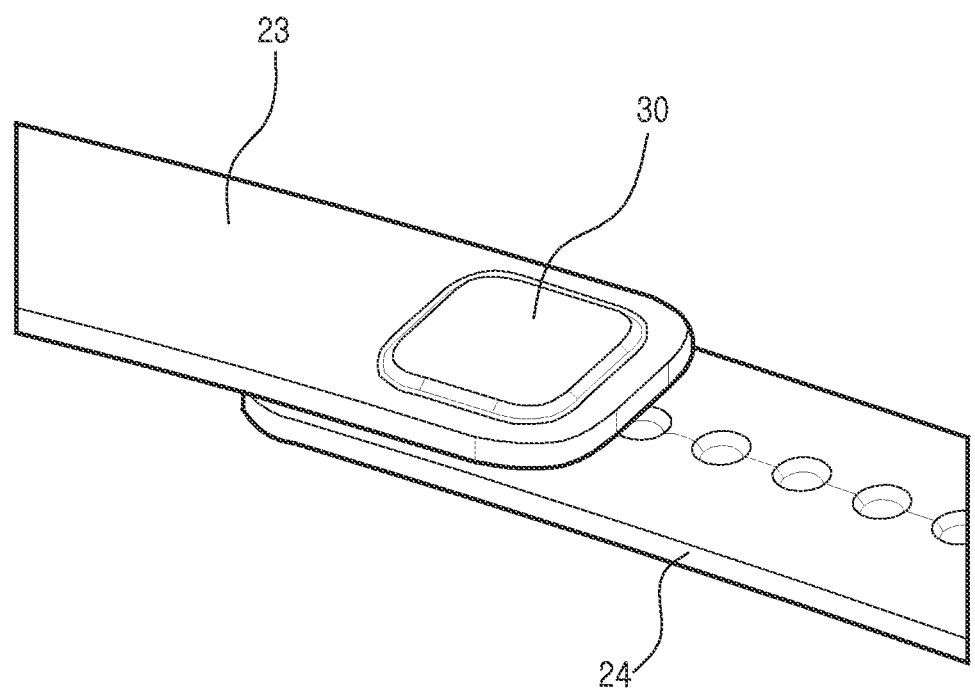
FIG. 11 is a perspective diagram illustrating a state in which a uniting tool is bound to a strap according to various embodiments of the present disclosure.
Figure 12:
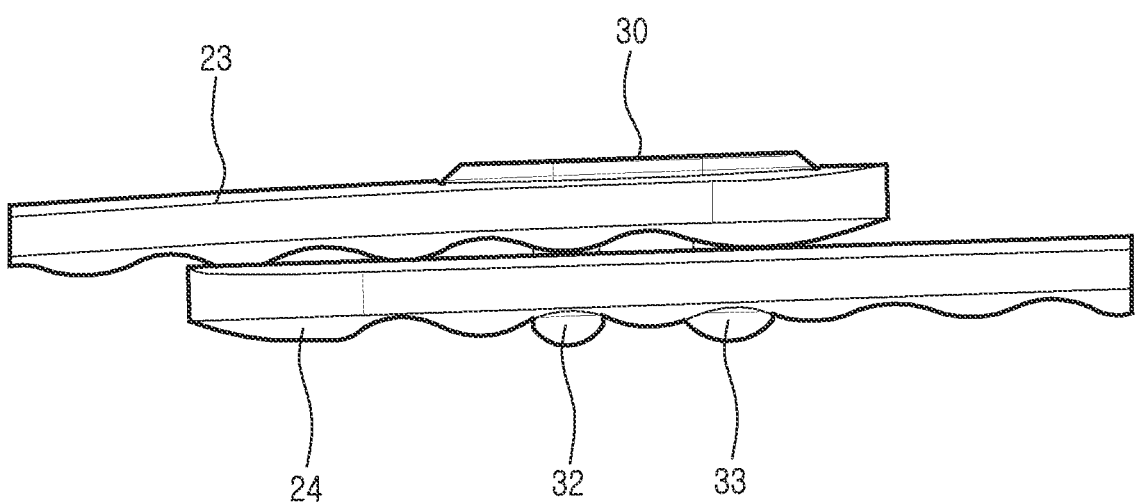
FIG. 12 is a side diagram illustrating a state in which a uniting tool is bound to a strap according to various embodiments of the present disclosure.

FIGS. 11 and 12 illustrate states in which a guide and a catching part of a uniting tool bind first and second straps according to various embodiments of the present disclosure.

Referring to FIGS. 11 and 12, a guide 32 and a catching part 33 of a uniting tool 30 bind first and second straps 23 and 24.

As described above, in a strap uniting device according to various embodiments of the prevent disclosure, a strap and a uniting tool are manufactured independently, the strap being manufactured of elastic materials, and the uniting tool being manufactured of metal materials, thereby being capable of forcibly attaching and detaching the uniting tool from the strap.

As described above, various embodiments of the present disclosure provide a uniting tool having a structure performing a guide function and a catching part performing a fixing function respectively, thereby preventing a phenomenon of spinning of one strap while making wrist wearing convenient.

Also, the various embodiments of the present disclosure construct the uniting tool detachable from a strap, and construct the uniting tool through various materials and colors, thereby exhibiting a user personality and improving a freedom degree of a product design.

Various embodiments of the present disclosure disclosed in the present specification and drawings merely suggest specific examples so as to easily describe the technological content of the present disclosure and help the understanding of the present disclosure, and do not intend to limit the spirit and scope of the present disclosure. Accordingly, it should be understood that the scope of the present disclosure includes all modified or deformed forms drawn on the basis of the technological spirit of the present disclosure besides the various embodiments disclosed herein.

According to various embodiments of the present disclosure, at least part of a device (e.g., modules or functions thereof) or method (e.g., operations) according to the present disclosure may be, for example, implemented by an instruction stored in a computer-readable storage media in a form of a programming module. In a case where the instruction is executed by one or more processors (e.g., the processor 120A), the one or more processors may perform functions corresponding to the instructions. The computer-readable storage media may be, for example, the memory 130A. At least part of the programming module may be, for example, implemented (e.g., executed) by the processor 120A. At least part of the programming module may include, for example, modules, programs, routines, sets of instructions, processes or the like for performing one or more functions.

The computer-readable recording media may include a magnetic media such as a hard disk, a floppy disk, and a magnetic tape, an optical media such as a Compact Disc-Read Only Memory (CD-ROM) and a DVD, a Magneto-Optical Media such as a floptical disk, and a hardware device configured to store and perform a program instruction (e.g., the programming module) such as a ROM, a Random Access Memory (RAM), a flash memory and the like. Also, the program instruction may include not only a mechanical code such as a code made by a compiler but also a high-level language code executable by a computer using an interpreter and the like. The aforementioned hardware device may be configured to operate as one or more software modules in order to perform an operation of the present disclosure, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A strap uniting device of a wearable device, the strap uniting device comprising:
   first and second straps; and
   a uniting tool disposed in an outer surface of and configured to protrude through the first strap and the second strap to thereby bind to the second strap, the uniting tool comprising:
      a substantially planar base;
      at least one guide comprising a first portion thereof attached to the base and a second portion thereof including a terminal distal end; and
      at least one catching part comprising a first portion thereof attached to the base and a second portion thereof including a terminal distal end,
   wherein the second portion of the at least one catching part comprises a part configured to inhibit removal through uniting openings of the first and second straps,
   wherein the at least one guide is configured to facilitate insertion and removal through the uniting openings and the second portion of the at least one guide is devoid of a part configured to inhibit removal through the uniting openings, wherein the at least one guide and the at least one catching part are substantially a cylindrical shape, and wherein the outer surface comprises a surface opposite to a surface that contacts a surface of the second strap.

2. The strap uniting device of claim 1, wherein each of the guide and the catching part is constructed in a multi-sided pillar shape.

3. The strap uniting device of claim 1, wherein the at least one guide comprises:

the first portion comprising a first cylindrical guide integrally formed in the base, and bound to the first strap;

a second cylindrical guide configured to have a greater diameter than the first cylindrical guide and comprising a first step part, and bound to the first strap by the first step part; and a convex curved-surface guide disposed at the terminal distal end of the at least one guide and extending from the second cylindrical guide and configured to facilitate insertion into a first uniting opening of the second strap.

4. The strap uniting device of claim 3, wherein the at least one catching part comprises:

the first portion comprising a first cylindrical catching part formed in the base and bound to the first strap;

a second cylindrical catching part configured, by a greater diameter than that of the first cylindrical catching part, to comprise a second step part, and bound to the first strap by the second step part;

a third cylindrical catching part configured, by a greater diameter than that of the second cylindrical catching part, to comprise a third step part, and bound to the second strap by the third step part; and a convex curved-surface catching part disposed at the terminal distal end of the at least one catching part and provided in an end of the third cylindrical catching part, and configured to facilitate insertion into a second uniting opening of the second strap.

5. The strap uniting device of claim 1, wherein the uniting tool is configured to be installed in an end of the first strap, and wherein the at least one catching part is arranged closer to an end of the first strap than is the at least one guide.

6. The strap uniting device of claim 5, wherein the at least one guide is bound to the first strap and is inserted into the second strap, thereby fixing the second strap to be immobile with respect to the first strap at a location of the at least one guide.

7. The strap uniting device of claim 5, wherein the uniting tool is formed of one of metal materials, hard synthetic resin, and soft synthetic resin.

\* \* \* \* \*